May 23, 1939.　　　K. LENZ ET AL　　　2,159,805
SEALING MATERIAL FOR VACUUM VESSELS
Filed Dec. 2, 1937
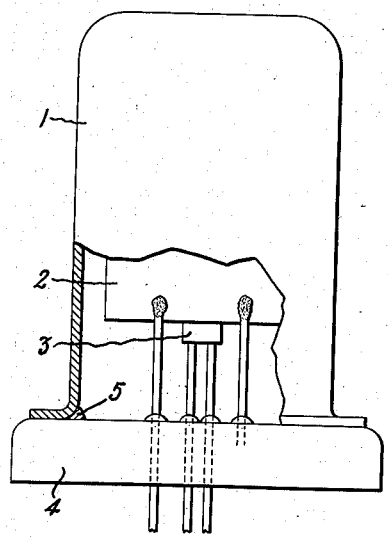
Inventors:
Kurt Lenz,
Ernst Woeckel,
by Harry E. Dunham
Their Attorney.

Patented May 23, 1939

2,159,805

UNITED STATES PATENT OFFICE 2,159,805

SEALING MATERIAL FOR VACUUM VESSELS

Kurt Lenz, Berlin-Lichterfelde, and Ernst Woeckel, Berlin-Friedenau, Germany, assignors to General Electric Company, a corporation of New York Application December 2, 1937, Serial No. 177,760
In Germany February 1, 1937

4 Claims. (Cl. 250—27.5)

The present invention relates to improved materials for joining or sealing the enclosing vessels of electrical devices which are necessarily subjected to high temperatures during the course of manufacture or operation.

In the manufacture of incandescent lamps, vacuum tubes and many other enclosed electrical devices, it is necessary to take great care to avoid contamination of electrodes or other enclosed parts by deposition of foreign substances thereon. Where the enclosing vessel is constituted of separate metal parts joined by a sealing material, the aforementioned consideration imposes definite limitations on the character of the sealing materials which may be satisfactorily employed. For example, in the fabrication of electrical discharge devices if one uses solders such as silver, copper or copper-silver alloys under conditions such that the solder is exposed to the interior of the vessel, objectionable vaporization of the solder on to the electrode surfaces occurs during the "bake-out" or degassing processes to which such devices are customarily subjected.

It is an object of the present invention to provide sealing materials which are not subject to appreciable vaporization even when heated to the temperatures ordinarily employed in "bake-out" processes.

This object is fulfilled in accordance with the invention by employing as a joining material, a eutectic alloy of at least one metal of the iron group (i. e., iron, nickel and cobalt) with a compound composed of a metal of such group and an element of the group which consists of phosphorous and arsenic (i. e., a phosphide or an arsenide of a metal of the iron group). By the term "eutectic alloy" is meant an alloy having the lowest possible melting point for the given constituents.

Such alloys are found to have good joining and sealing properties and are further characterized by being only slightly vaporizable at the temperatures ordinarily encountered during manufacturing processes. Consequently even though the joints to be sealed are so located that the sealing material is exposed to the interior of a vacuum vessel, no contamination of electrodes or other operative elements within such vessel occurs during "bake-out" or equivalent treatments.

Particularly suitable for a melting temperature of about 1050° C. is an alloy of iron and iron-phosphide ($Fe_3P$) with a content of about 89.5% of free and bound iron and about 10.5% of bound phosphorous. For about this same temperature, one may use an alloy of cobalt with cobalt-phosphide ($Co_2P$) with an overall content of 88.5% free and bound cobalt and 11.5% bound phosphorous. This combination has a melting point of about 1022° C. The preferred alloy of nickel and nickel-phosphide contains a total of about 89% free and bound nickel and about 11% bound phosphorous. It has a melting point of 880° C. The following arsenide alloys are also considered suitable: 70% of free and bound iron with about 30% of bound arsenic (melting point 830° C.); and 72% of free and bound nickel with about 28% of bound arsenic (melting point 898° C.). For certain uses, where an extremely low melting point is desired one may use an alloy containing 57% free and bound nickel and 43% of bound arsenic.

Due to the inherent brittleness of the alloys described in the foregoing it is advantageous to utilize them in a pulverized state. Thus in performing sealing operations, a paste may be formed by combining the pulverized alloy with a readily evaporating liquid binder such as alcohol or purified petroleum. This paste is then placed in suitable grooves or indentations formed between the metal parts to be joined and the assembly heated to cause evaporation of the binder. As the temperature is raised to a still higher value the residual powder melts and joints the metal parts in hermetically sealed relationship.

In the single figure of the drawing we have indicated the application of the invention in connection with a vacuum tube of the all-metal type. This comprises an evacuated metal shell 1, containing electrodes which include an anode 2, and a cathode 3. The lower end of the envelope is flanged and is closed by means of a transverse metal header 4 which is joined to the flange. In accordance with our invention the joint between the flange and the header is sealed by means of one of the sealing alloys described in the foregoing. Such an alloy, whose presence in the sealed joint is indicated at 5, possesses sufficiently low vapor pressure to avoid the danger of contaminating the electrode elements during fabrication or operation of the device.

The invention can be used not only for joining metal parts of electric vacuum vessels but also for other special vacuum vessels such as transportation tanks for rare gases.

What we claim as new and desire to obtain by Letters Patent of the United States is:

1. An electrical discharge device comprising a sealed vessel enclosing electrode structure which is subject to contamination by metallic vapors metal parts forming constituent elements of the vessel, and a metallic sealing material hermetically joining said parts and at least partially exposed to the interior of the vessel, said material comprising a eutectic alloy of at least one metal of the iron group with a compound composed of a metal of such group and an element of the group which consists of phosphorous and arsenic.

2. The combination of claim 1 in which the sealing material contains about 89.5% of free and bound iron and about 10.5% of bound phosphorous.

3. The combination of claim 1 in which the sealing material contains about 88.5% free and bound cobalt and about 11.5% free and bound phosphorous.

4. The combination of claim 1 in which the sealing material contains about 70% free and bound iron and about 30% bound arsenic.

KURT LENZ.
ERNST WOECKEL.